United States Patent
Dayan et al.

[11] Patent Number: 5,287,519
[45] Date of Patent: Feb. 15, 1994

[54] LAN STATION PERSONAL COMPUTER SYSTEM WITH CONTROLLED DATA ACCESS FOR NORMAL AND UNAUTHORIZED USERS AND METHOD

[75] Inventors: Richard A. Dayan, Boca Raton; Kimthanh D. Le, Boynton Beach; Matthew T. Mittelstedt, Lantana; Palmer E. Newman, Boca Raton; Dave L. Randall, Pompano Beach; Lisa A. Ruotolo, Lake Worth; JoAnna B. Yoder, Delray Beach, all of Fla.

[73] Assignee: International Business Machines Corp., Armonk, N.Y.

[21] Appl. No.: 947,019

[22] Filed: Sep. 17, 1992

[51] Int. Cl.⁵ .................. G06F 13/14; G06F 7/04
[52] U.S. Cl. .................. 395/700; 380/23; 380/49; 395/575; 395/200; 340/825.31; 364/DIG. 1; 364/222.5; 364/280.2; 364/286.4; 364/286.5; 364/918.7
[58] Field of Search .................. 380/4, 23, 25, 49, 50; 340/825.31, 825.34; 395/575, 700, 200, 800; 364/184; 235/382; 370/60, 94.1

[56] References Cited

U.S. PATENT DOCUMENTS

| | | | |
|---|---|---|---|
| 4,262,329 | 4/1981 | Bright et al. | 364/DIG. 1 |
| 4,672,572 | 6/1987 | Alsberg | 380/23 |
| 4,992,783 | 2/1991 | Zdunek et al. | 340/823.34 |
| 5,218,701 | 6/1993 | Miyazaki | 395/700 |

Primary Examiner—Eddie P. Chan
Attorney, Agent, or Firm—Daniel E. McConnell

[57] ABSTRACT

A method and medialess personal computer system workstation (or LAN station as herein defined) adaptable for securing the system against attack on a secured network with which the LAN station is associated. A flag bit is set in system memory during a power on self test to indicate whether access may be had to certain security features of the system, and a procedure is described by which access to a network stored configuration setting program may be gained in order to install, change or remove a password used for securing the LAN station while avoiding passing the critical password data through the network.

4 Claims, 7 Drawing Sheets

LAN STATION PERSONAL COMPUTER SYSTEM WITH CONTROLLED DATA ACCESS FOR NORMAL AND UNAUTHORIZED USERS AND METHOD

RELATED APPLICATIONS

This invention is related to inventions described in copending applications Ser. Nos. 889,324 and 889,325 filed May 27, 1992 and owned in common with the invention here described.

TECHNICAL FIELD

This invention relates to personal computer systems and, more particularly, to such a system used in a local area network as a workstation and having security features enabling control over access to data accessible to such a system and retained in the network.

BACKGROUND TO THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard (also known as and occasionally mentioned herein as a system board, system planar or planar) to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, 35, 40, L40SX, 50, 55, 56, 57, 65, 70, 80, 90 and 95.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 57 through 95. Early Family I models typically used the popular INTEL 8088 or 8086 microprocessor as the system processor. Certain later Family I and the Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provides hardware compatibility with software written for the 8086 and 8088 microprocessors.

Beginning with the earliest personal computer system of the Family I models, such as the IBM Personal Computer, it was recognized that software compatibility would be of utmost importance. In order to achieve this goal, an insulation layer of system resident code, also known as "firmware", was established between the hardware and software. This firmware provided an operational interface between a user's application program/operating system and the device to relieve the user of the concern about the characteristics of hardware devices. Eventually, the code developed into a Basic Input/Output System (BIOS), for allowing new devices to be added to the system, while insulating the application program from the peculiarities of the hardware. The importance of BIOS was immediately evident because it freed a device driver from depending on specific device hardware characteristics while providing the device driver with an intermediate interface to the device. Since BIOS was an integral part of the system and controlled the movement of data in and out of the system processor, it was resident on the system planar and was shipped to the user in a read only memory (ROM). For example, BIOS in the original IBM Personal Computer occupied 8K of ROM resident on the planar board.

As new models of the personal computer family were introduced, BIOS had to be updated and expanded to include new hardware and I/O devices. As could be expected, BIOS started to increase in memory size. For example, with the introduction of the IBM PERSONAL COMPUTER AT, BIOS grew to require 32K bytes of ROM.

Today, with the development of new technology, personal computer systems of the Family II models are growing even more sophisticated and are being made available to consumers more frequently. Since the technology is rapidly changing and new I/O devices are being added to the personal computer systems, modification to the BIOS has become a significant problem in the development cycle of the personal computer system. For instance, with the introduction of the IBM personal System/2 with Micro Channel architecture, a significantly new BIOS, known as advanced BIOS, or ABIOS, was developed. However, to maintain software compatibility, BIOS from the Family I models had to be included in the Family II models. The Family I BIOS became known as Compatibility BIOS or CBIOS. However, as previously explained with respect to the IBM PERSONAL COMPUTER AT, only 32K bytes of ROM were resident on the planar board. Fortunately, the system could be expanded to 96K bytes of ROM. Unfortunately, because of system constraints, this turned out to be the maximum capacity available for BIOS. Luckily, even with the addition of ABIOS, ABIOS and CBIOS could still squeeze into 96K of ROM. However, only a small percentage of the 96K ROM area remained available for expansion. It has been believed that, with the addition of future I/O devices, CBIOS and ABIOS will eventually run out of ROM space. Thus, new I/O technology will not be able to be easily integrated within CBIOS and ABIOS.

Due to these problems, plus the desire to make modifications in Family II BIOS as late as possible in the development cycle, it became necessary to offload portions of BIOS from the ROM. This was accomplished by storing portions of BIOS on a mass storage device such as a fixed disk, preferably in a defined portion of such a disk known as a system partition. The system partition also stores an image of a system reference diskette, which includes certain utility programs used in establishing system configuration and the like. Since a disk provides writing as well as reading capabilities, it became feasible to modify the actual BIOS code on the disk. The disk, while providing a fast and efficient way to store BIOS code, nevertheless greatly increased the probability of the BIOS code being corrupted. Since BIOS is an integral part of the operating system, a corrupt BIOS could lead to devastating results and in many cases to complete failure and non-operation of the system. Thus, it became quite apparent that a means for preventing unauthorized modification of the BIOS code on the fixed disk was highly desirable. This was the subject matter of U.S. patent application Ser. No. 07/398,820, filed Aug. 25, 1989, and now U.S. Pat. No. 5,022,077 issued Jun. 4, 1991. The interested reader is referred to that patent for additional information possibly helpful in understanding of the invention here disclosed, and the disclosure of that patent is hereby incorporated by reference into this specification to any extent necessary to a full understanding of the inventions here disclosed.

With the introduction of IBM's PS/2 Micro Channel Systems came the removal of switches and jumpers from I/O adapter cards and planar. The Micro Channel Architecture provided for programmable registers to replace them. Utilities to configure these programmable registers or programmable option select (POS) registers were required. These, and other utilities to improve system usability characteristics along with system diagnostics, were shipped with each system on a system reference diskette.

Prior to initial use, each Micro Channel system requires that its POS registers be initialized. For example, if the system is booted with a new I/O card, or a slot change for an I/O card, a configuration error is generated and the system boot up procedure halts. The user is then prompted to load the system reference diskette and press the F1 key. A "Set Configuration Utility" can then be booted from the system reference diskette to configure the system. The Set Configuration Utility will prompt the user for the desired action. If the appropriate I/O card's descriptor files are loaded on the system reference diskette, the Set Configuration Utility will generate the correct POS or configuration data in non-volatile storage. The descriptor file contains configuration information to interface the card to the system.

With the phenomenal growth and use of personal computers in the world in recent years, more and more data or information is being collected and retained or stored in such systems. A lot of this data is sensitive in nature. In the wrong hands, data could become embarrassing to individuals, a company could lose a competitive edge, or sensitive data could be used to force payment for silence or lead to physical violence against individuals. As more users recognize the sensitive nature of data and its value, the more it becomes desirable to protect against such misuse. To protect themselves and the persons associated with the stored data, users are requiring incorporation of security and integrity features into the personal computers that they purchase.

Users are not the only people to recognize the sensitivity of the data being collected and stored. Governments are also enacting laws to enforce protection of sensitive data. One such government is that of the United States. It has recognized and responded to the gravity of the situation. The United States federal government has defined security levels and the associated requirements it takes to meet those levels, and provides a certification agency for personal computer manufacturers to submit products in order to see if the products meet the security level claimed by the manufacturer. The source for the Federal Requirements is the Department of Defense, Trusted Computer System Evaluation Criteria, DOD 5200.28 STD, 12/85, generally referred to as The Orange Book. The government has legislated that by Jan. 1, 1992 all data related to the government must only be processed and stored on personal computers with a minimum security level of C-2. For computer system hardware, the essence of the requirements is contained in the Assurance section, Requirement 6: "trusted mechanisms must be continuously protected against tampering and/or unauthorized changes . . . "

In yet another related development, personal computers have been joined together into networks in various ways and through the use of various schemes. In some such networks, personal computers are used essentially as "dumb" terminals communicating with a powerful host computer which may be of the large size known as a mainframe and which serves to provide large databases and as the location of residence of applications programs which will manipulate data. In other network arrangements, personal computers are used as "smart" terminals which obtain application programs and sometimes data from a central file server (which may be another personal computer equipped with a direct access storage device of large capacity and capable of operating at relatively quick data recovery speeds), manipulate or receive entry of data, and return data to the file server. In still other arrangements, a group of personal computers may share among the group resources available to one or more of the systems in the network, such as peripheral devices such as printers, scanners, modems, etc. and application program or data files located on various direct access storage devices each of which is more directly associated with a single one of the resource sharing personal computers. Many such network arrangements are known as a local area network or LAN (the latter acronym being a defined term for purposes of this description).

As the use of personal computers in a LAN has increased, it has been recognized that the expense of a machine used in such an environment can be decreased by removing from such a computer system elements which are more usually found in personal computers as defined hereinabove. As a result, personal computers lacking direct access storage devices such as hard drives and floppy disc drives have come into use. Such systems are often known as media-less systems or LAN stations (the latter phrase being a defined term for purposes of this description).

The use of personal computers in local area networks may give rise to yet another area of potential impact in that any given personal computer typically is configured for certain functions which are provided, with such configuring being done at least in part as a BIOS function. These functions may include (particularly where C-2 security is targeted to be achievable) controls over access to various secure levels of information. With a stand alone personal computer not associated with a LAN, autoconfiguration is known and conventionally occurs as part of a start up procedure and security features may include those of the first mentioned related applications (which are hereby incorporated by reference into this application to any extent necessary to a full understanding of the invention here described). With a computer associated with a LAN, such configuration may occur as a function of BIOS stored in the computer and accessed as part of the start up procedure. However, it may be desirable for configuration of a particular computer connected with a LAN to be automatically set by the LAN on power on for that computer. Specifically in the case of a LAN station connected into a LAN dealing with data to be secured, it is imperative that appropriate provision be made for the system owner to control any possibility of attack on the LAN through such a LAN station.

SUMMARY OF THE INVENTION

Having in mind the discussion given above, this invention contemplates providing a LAN station personal computer system (one having no program storage media such as a hard disc drive or a floppy disc drive) and which has provision for an authorized user or system owner (as defined hereinafter) to secure the station which use in a LAN having data accessible therethrough which must be secured. In realizing this goal, the LAN station may have the necessary security features enabled in an appropriate way while avoiding any transfer over the network of the critical data such as a security password. Instead, provision is made in the system and in the method of securing the system for such critical data to be entered directly at the LAN station by an authorized user or system owner.

BRIEF DESCRIPTION OF THE DRAWINGS

Some of the objects of the invention having been stated, other objects will appear as the description proceeds, when taken in connection with the accompanying drawings, in which.

DETAILED DESCRIPTION OF INVENTION

Figure 1:
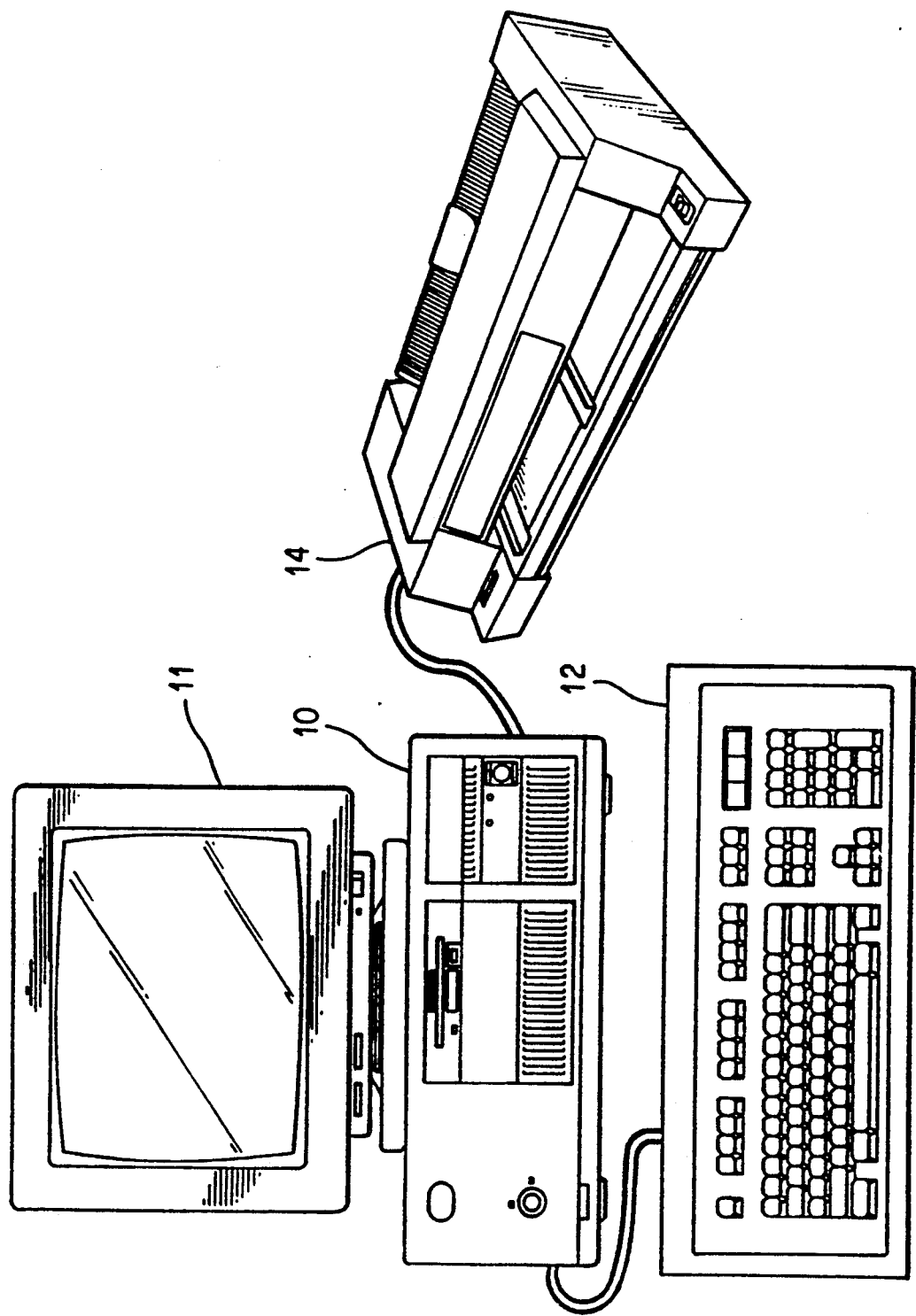
FIG. 1 is a perspective view of a personal computer embodying this invention.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Certain defined terms may be used herein, as follows:

TRUSTED COMPUTING BASE (TCB): The totality of protection mechanisms within a computer system—including hardware, firmware and software—the combination of which is responsible for enforcing a security policy. A TCB consists of one or more components that together enforce a unified security policy over a product or system. The ability of a TCB to correctly enforce a security policy depends solely on the mechanisms within the TCB and on the correct input by system administrative personnel of parameters (e.g. a user's clearance) related to the security policy.

TRUSTED SOFTWARE: The software portion of a Trusted Computing Base.

TRUSTED PROGRAM: A program included in Trusted Software.

OPEN PROGRAM: A program operable on a Trusted Computing Base and which is other than a Trusted Program.

REFERENCE MONITOR CONCEPT: An access control concept that refers to an abstract machine that mediates all accesses to objects by subjects.

SECURITY KERNEL: The hardware, firmware and software elements of a Trusted Computing Base that implement the reference monitor concept. It must mediate all accesses, be protected from modification and be verifiable as correct.

TRUSTED COMPUTER SYSTEM: A system that employs sufficient hardware and software integrity measures to allow its use for processing simultaneously a range of sensitive or classified information.

SYSTEM OWNER: The system owner is the user who is responsible for configuring and placing a system in secure mode initially. The system owner will control configuration both initially and whenever an update needs to be made. This person will control the Privileged Access Password and be responsible for maintaining its integrity. The system owner will also maintain physical security of the tamper evident cover keylock key. The system owner will be responsible for maintaining security logs on all systems. The system owner will also have to record all attempted security breaches. The system owner may own more than one system. The system owner is considered an authorized user and can also be a normal user.

SECURE MODE: When a system owner has successfully installed the Privileged Access Password on a personal computer system to invoke security protection provided by the security and integrity elements.

AUTHORIZED USER: Any user who is given permission to use the Privileged Access Password. This person may or may not be the system owner. This person may also have a key for a particular system or a set of systems. If this person is involved in recovering a system from a security breach, they are responsible for reporting it to the system owner. An authorized user may also be a normal user.

NORMAL USER: Any user of a system authorized to use the system facilities. In order to change a system configuration or fix a problem, this user requires the assistance of either the system owner or an authorized user. The normal user does not have the Privileged Access Password or the tamper evident cover keylock key unless they belong to either the authorized user or system owner category.

UNAUTHORIZED USER: Any one not defined as a system owner, authorized user or normal user. Any use of a secured personal computer system by an unauthorized user is considered a security breach, other than an unsuccessful power on, and an audit trail must exist showing such breaches.

EEPROM: Electrically Erasable Programmable Read Only Memory. This memory technology provides for non-volatile storage of data that can be changed under control of hardware logic. Contents of storage is not lost when power is absent. Contents may be altered only when the appropriate controls signals on the module are activated in the predefined sequence.

PASSWORD DESCRIPTION: The system has the potential to be protected by two passwords: 1. Privileged Access Password (PAP) and 2. Power On Password (POP). These passwords are intended to be used independently of one another. The PAP is designed to provide protection for the system owner by protecting the Initial Program Load (IPL) device boot list, access to the password utility, and access to a System Reference Diskette image. In the network environment with which the present invention is concerned, access to the boot list, password utility and reference diskette or system partition can only be through the network server, the LAN station being medialess and thus lacking any capability for such access directly at the LAN station. This is a significant characteristic of this invention. The existence of the PAP will be transparent to a normal user using the POP. The PAP will be installed, changed, or deleted by a utility on a System Reference Diskette image accessible through the server. The PAP, when set and entered correctly, will give the owner access to the entire system, overriding the POP. The POP, working as on all current PS/2 systems, is used to prevent any unauthorized access to the network server or the facilities of the network.

Figure 2:
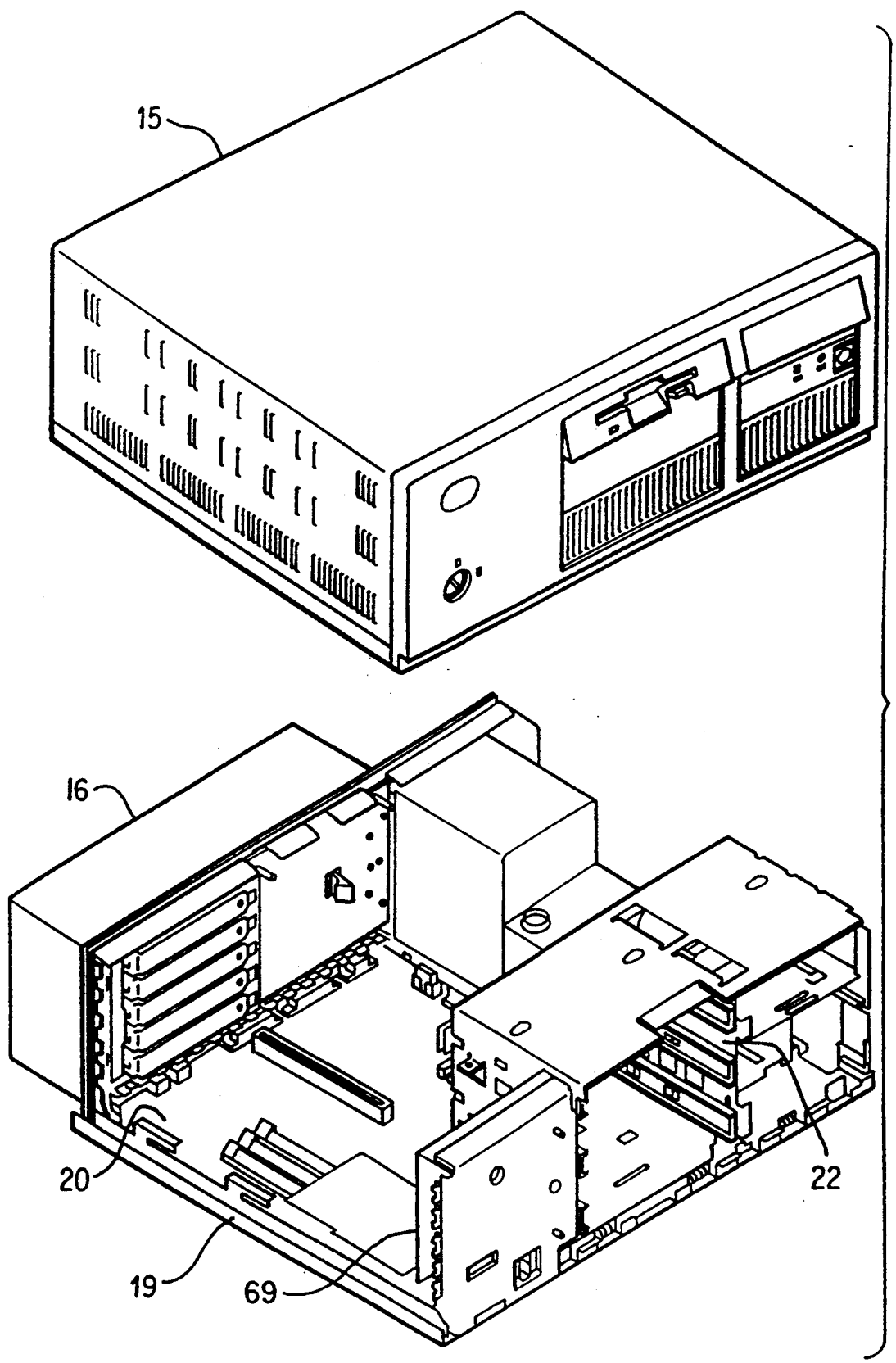
FIG. 2 is an exploded perspective view of certain elements of the personal computer of FIG. 1 including a chassis, a cover, and a planar board and illustrating certain relationships among those elements.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 which cooperates with a chassis 19 in defining an enclosed, shielded volume for receiving electrically powered data processing and storage components for processing and storing digital data, as shown in FIG. 2. In the form illustrated in FIG. 2, the computer 10 also has an optional I/O cable connection cover 16 which extends over and protects the connection points of I/O cables with the computer system. At least certain of the system components are mounted on a multilayer planar 20 (also described herein as a motherboard or system board) which is mounted on the chassis 19 and provides a means for electrically interconnecting the components of the computer 10 including those identified above and such other associated elements as floppy disk drives, various forms of direct access storage devices, accessory cards or boards, and the like.

The chassis 19 has a base and a rear panel (FIG. 2, and which may be covered externally by the cable connection cover 16) and defines at least one open bay for receiving a data storage device such as a disk drive for magnetic or optical disks, a tape backup drive, or the like. In the illustrated form, an upper bay 22 is adapted to receive peripheral drives of a first size (such as those known as 3.5 inch drives). A floppy disk drive, a removable media direct access storage device capable of receiving a diskette inserted thereinto and using the diskette to receive, store and deliver data as is generally known, may be provided in the upper bay 22. However, for use as a LAN station as described herein, no such direct access storage device would be provided, in order to decrease the expense of the system 10.

Figure 3:
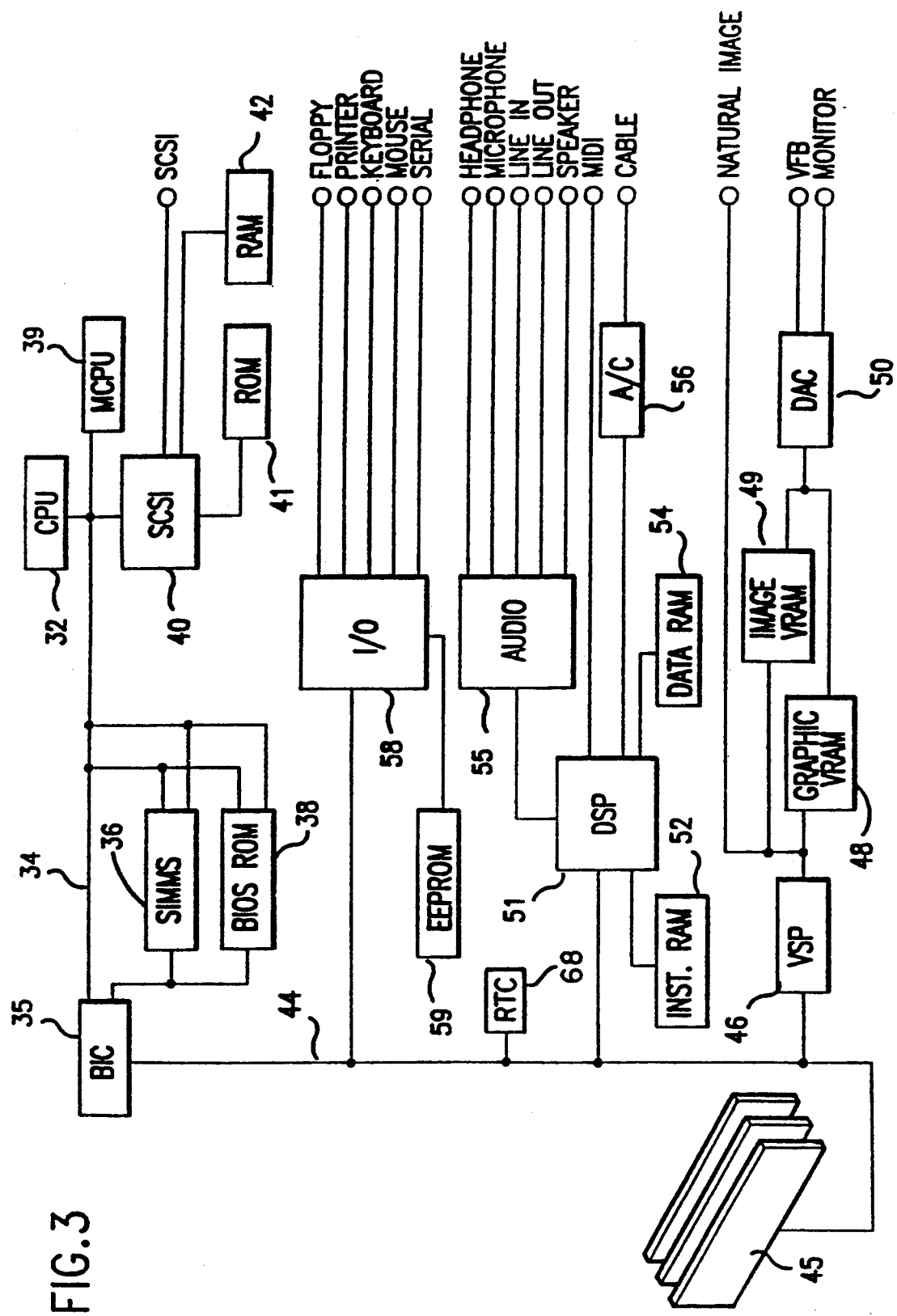
FIG. 3 is a schematic view of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 32. While any appropriate microprocessor can be used as the CPU 32, one suitable microprocessor is the 80386 which is sold by INTEL. The CPU 32 is connected by a high speed CPU local bus 34 to a bus interface control unit 35, to volatile random access memory (RAM) 36 here shown as Single Inline Memory Modules (SIMMs) and to BIOS ROM 38 in which is stored instructions for basic input/output operations to the CPU 32. The BIOS ROM 38 includes the BIOS that is used to interface between the I/O devices and the operating system of the microprocessor 32. Instructions stored in the BIOS ROM 38 can be copied into RAM 36 to decrease the execution time of BIOS. The system also has, as has become conventional, a circuit component which has battery backed non-volatile memory (conventionally CMOS RAM and also known as NVRAM) for receiving and retaining data regarding the system configuration and a real time clock (RTC) 68 (FIG. 3).

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80286 or 80486 microprocessor.

Returning now to FIG. 3, the CPU local bus 34 (comprising data, address and control components) also provides for the connection of the microprocessor 32 with a math coprocessor (MCPU) 39 and may provide for a Small Computer Systems Interface (SCSI) controller 40. If present, the SCSI controller 40 may, as is known to persons skilled in the arts of computer design and operation, be connected or connectable with Read Only Memory (ROM) 41, RAM 42, and suitable internal or external devices of a variety of types as facilitated by the I/O connection indicated to the right in the Figure. The SCSI controller 40 functions as a storage controller in controlling storage memory devices such as fixed or removable media electromagnetic storage devices (also known as hard and floppy disk drives), electro-optical, tape and other storage devices. As noted above, such devices are conventionally omitted in a LAN station personal computer for economic reasons and the SCSI controller may be omitted for the same reasons. However, because purchasers of LAN stations may wish to contemplate the future upgrading of such systems, such elements as a SCSI controller and/or bays for DASD are often provided.

The bus interface controller (BIC) 35 couples the CPU local bus 34 with an I/O bus 44. By means of the bus 44, the BIC 35 is coupled with an optional feature bus such as a MICRO CHANNEL bus having a plurality of I/O slots for receiving MICRO CHANNEL adapter cards 45 which may be further connected to an I/O device or memory (not shown). The I/O bus 44 includes address, data, and control components. Conventionally in a LAN station system, one option card 45 provides the point of interconnection of the system with the network in which it is associated.

Coupled along the I/O bus 44 are a variety of I/O components such as a video signal processor 46 which is associated with video RAM (VRAM) for storing graphic information (indicated at 48) and for storing image information (indicated at 49). Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc. The I/O bus 44 is also coupled with a Digital Signal Processor (DSP) 51 which has associated instruction RAM 52 and data RAM 54 available to store software instructions for the processing of signals by the DSP 51 and data involved in such processing. The DSP 51 provides for processing of audio inputs and outputs by the provision of an audio controller 55, and for handling of other signals by provision of an analog interface controller 56. Lastly, the I/O bus 44 is coupled with a input/output controller 58 with an associated Electrical Erasable Programmable Read Only Memory (EEPROM) 59 by which inputs and outputs are exchanged with conventional peripherals including floppy disk drives, a printer or plotter 14, keyboard 12, a mouse or pointing device (not shown), and by means of a serial port. The EEPROM plays a part in the security provisions described herein.

In achieving certain objectives of securing a personal computer system as described herein, the personal computer system 10 has an erasable memory element mounted within the system enclosure for selective activation to active and inactive states and for receiving and storing a privileged access password when in the active state. The erasable memory element preferably is at least one field or portion of the electrically erasable programmable read only memory device or EEPROM 59 (FIG. 3) described above. The system also has an option or security switch mounted within the enclosure and operatively connected with the erasable memory element 59 for setting the used field or portion of that memory element to the active and inactive states. The option switch (also called security switch in this disclosure) may be, for example, a jumper mounted on the system planar 20 and manually settable to two different states by a person having access to the planar. In one state (also mentioned herein as the write enable or unlocked state), the EEPROM 59 is set to be active and to store a PAP as described herein. In the write enable state, the PAP may be written to the EEPROM, changed or removed. In the other or inactive state (also mentioned herein as the write disabled or locked state), the PAP storage capability of the EEPROM is set to be inactive.

In accordance with this invention, the default state of the LAN station system 10 as manufactured puts the system into unsecured mode on power-up. In order for the system to become a secure system, the system owner must open the locked covers and intentionally change the state of the security switch provided on the system planar 20, thereby enabling the activation of a security password and rendering the system a secure system. Further, the system owner or an authorized user must sequence the system through a particular process to install a PAP, and that process and the system characteristics which accommodate it are the particular focus of this invention.

Figure 4:
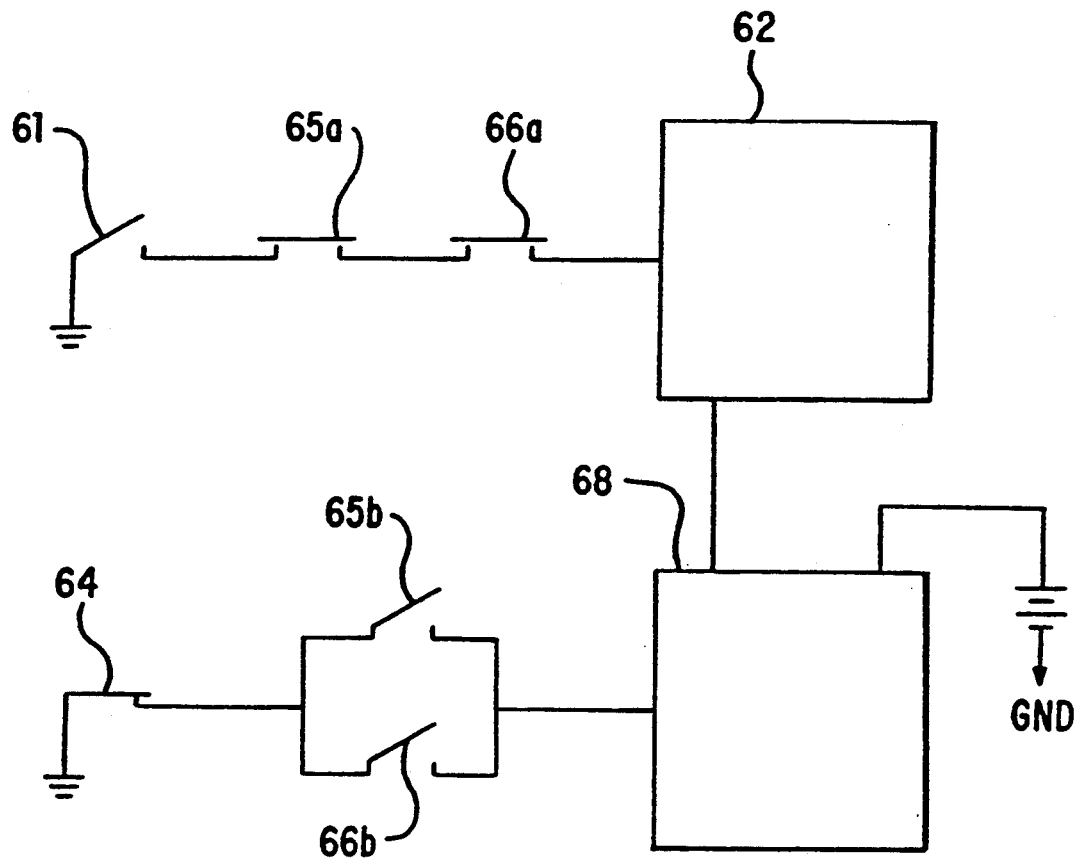
FIGS. 4 and 5 are schematic representations of certain components of the personal computer of FIGS. 1 and 2 which are related to the security features of the present invention.
Figure 5:
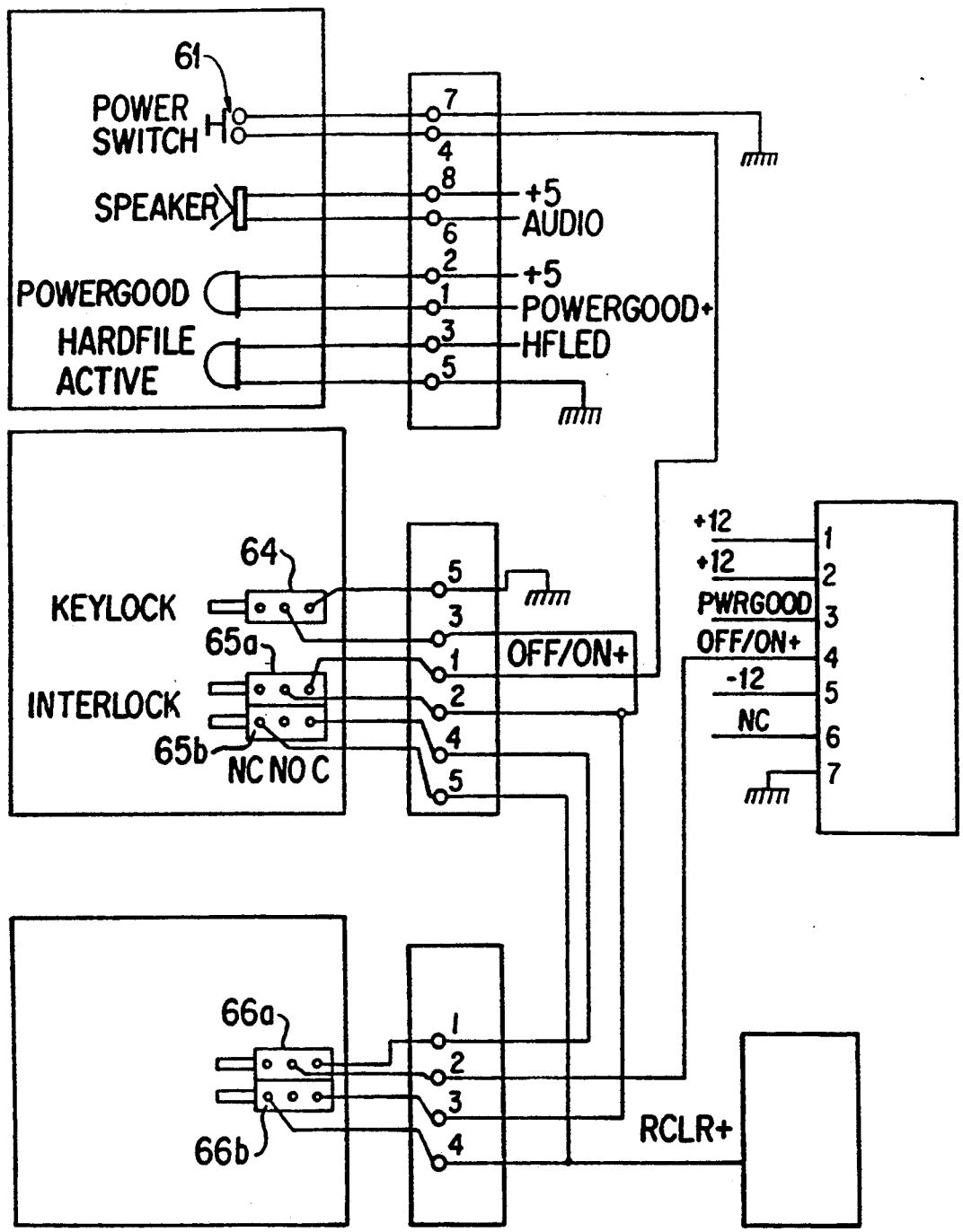
Figure 6:
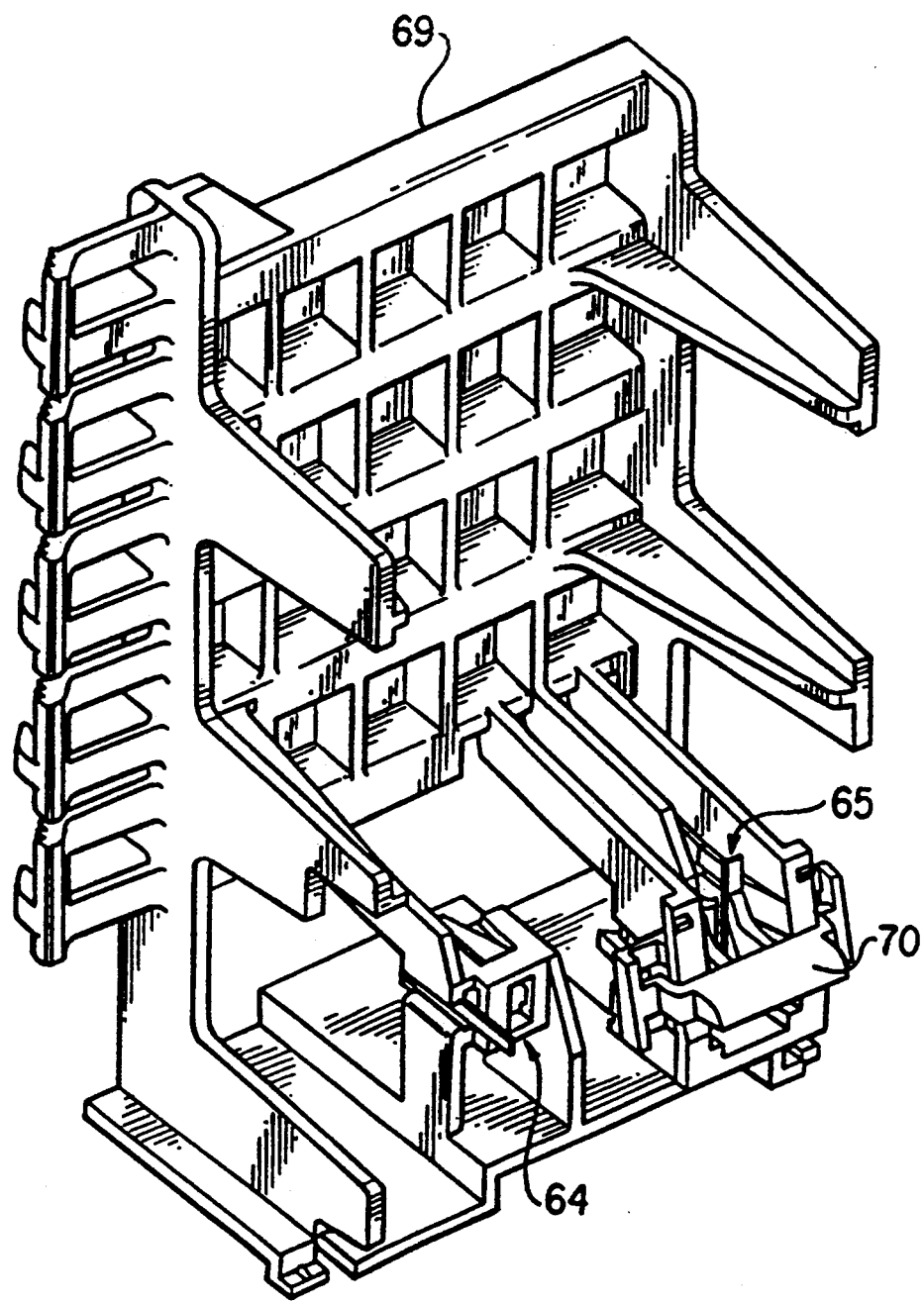
FIG. 6 is an enlarged scale perspective view of certain components illustrated in FIGS. 4 and 5.
Figure 7:
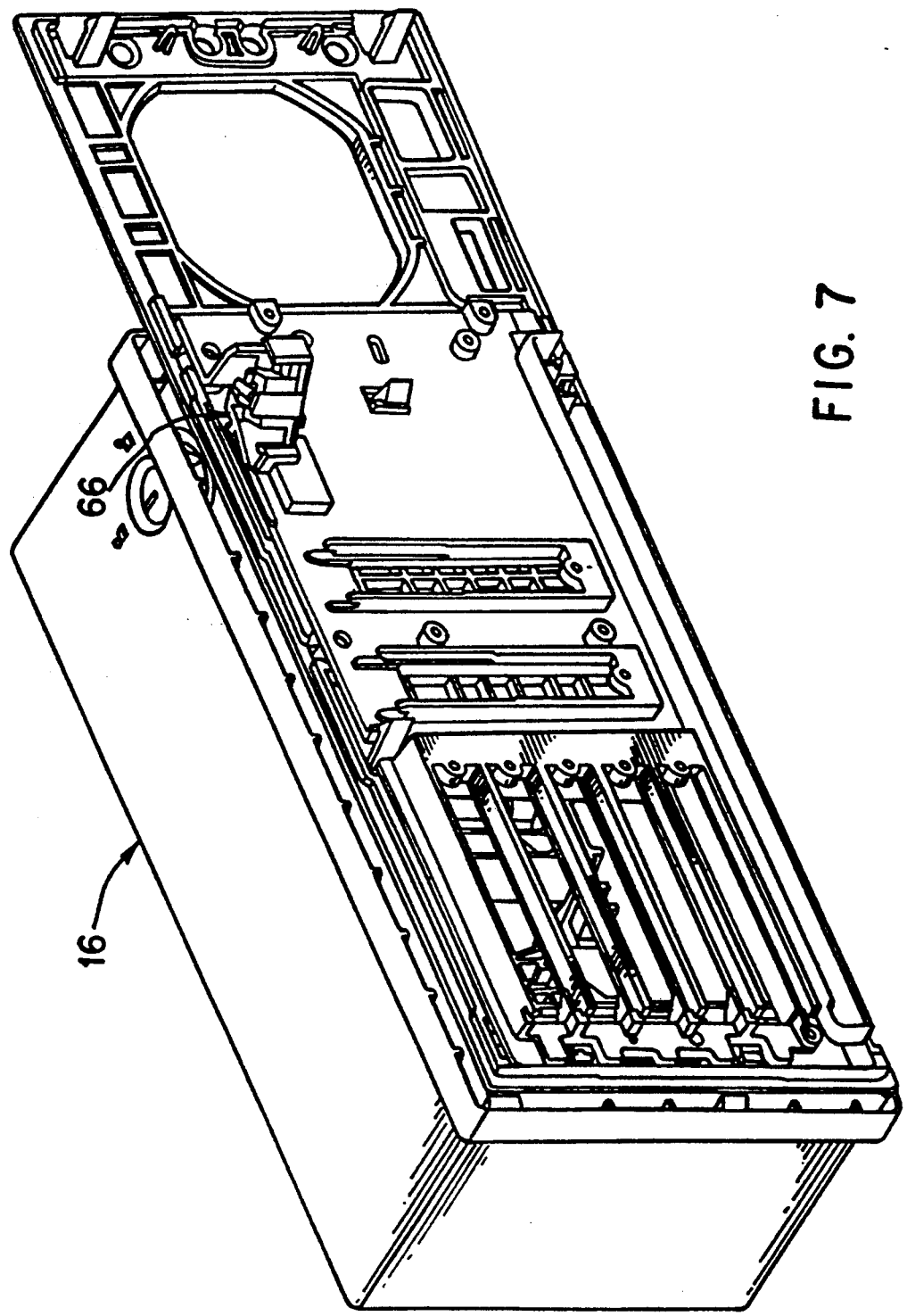
FIG. 7 is a view similar to FIG. 6 of certain optional components of the personal computer of FIGS. 1, 2, 4 and 5 which are related to the security features of the present invention.

As mentioned above, the system 10 also has a second component having erasable memory capabilities, namely battery supported, non-volatile CMOS RAM and an associated real time clock (RTC), indicated at 68 in FIG. 4. The CMOS RAM or NVRAM stores data indicative of the system configuration including, in accordance with this invention, data regarding the successful entry of the PAP on power up of the system 10. At least one tamper detection switch (FIGS. 4, 5 and 6) is provided, mounted within the enclosure and operatively connected with the CMOS RAM for detecting opening of the enclosure and for clearing or setting certain data stored in that memory element in response to any switching of the tamper detection switch.

The system processor 32, in accordance with this invention, is operatively connected with the EEPROM 59 and the CMOS RAM 68 and functions in part for controlling access to at least certain levels of data stored within the system by distinguishing between the active and inactive states of the PAP storage capability of the memory element and between entry and non-entry by a user of any valid, stored privileged access password (PAP). By manipulating the option switch, an operator (or more specifically the person charged with supervising and maintaining the security) of the system and associated network may select between secured operation of the system and unsecured operation of the system by selecting respective active and inactive states of the EEPROM. If secured operation is desired and to be effectuated, then the system owner must also enter a PAP.

As here disclosed, the system adapted for security concerns in accordance with this invention has two separate non-volatile erasable memory elements—the EEPROM and the CMOS RAM. This is done, in part, because at the time of this invention, EEPROM have a limited life in terms of the number of cycles of erasing and writing, while the indicators of the state of the PAP and the correct entry of the PAP, as well as at least potentially the state of any unauthorized opening of the system enclosure, may need to be erased and written a large number of times. Thus the functions described herein have been separated into first and second erasable memory elements in order to adapt to presently available technology. However, the invention contemplates that the two forms of related data may be stored in a single erasable memory element where either technology so permits or a system designer is willing to accept the limitations which follow such a choice.

Referring now to the schematic views of FIGS. 4 through 7, certain of the hardware features involved in this invention will now be more particularly described.

FIG. 4 illustrates certain relationships among the conventional power control or "on/off" switch 61, the conventional power supply 62, switches which change conductive state in response to opening or removal of enclosure covers such as the main cover 15 and the cable connection cover 16, and a keylock switch 64. The switches which change state on opening or removal of enclosure covers are, in the illustrated form of this invention, two in number; namely a switch 65 (FIGS. 4, 5 and 6) responsive to removal of the main cover 15 and a switch 66 (FIGS. 4, 5 and 7) responsive to removal of the cable connection cover 16. Each switch has two components, one normally open (65a and 66a, respectively) and one normally closed (65b and 66b, respectively). The second switch 66 is optional, as is the cable connection cover 16. However, as will be clear from a thoughtful consideration of the disclosure here made, the presence of the optional cover and switch assures more complete security control over the system.

The normally open contact sets of the cover switches 65 and 66 are connected in series with the main power switch 61 and to the power supply 62 (FIG. 4). As a consequence, if an attempt is made to "power up" the system 10 with the covers removed, the contact sets 65a and 66a will be open and prevent system operation. With the covers in place, the contact sets are held closed and normal system operation may be initiated.

The normally closed contact sets of the cover switches 65 and 66 are connected in series with the keylock switch 64 and to the CMOS RAM 68. The normally closed contact sets 65b and 66b are held open by the presence of the covers 15, 16 and will close on the removal of those covers. The keylock switch 64 is normally held closed on locking of the enclosure lock which is conventionally supplied on the computer system 10. These three contact sets provide an alternate path to ground for current otherwise energizing portions of the CMOS RAM, and have the effect of setting a segment of that memory to a distinctive state (such as all "1"s) if energization is lost, as upon unauthorized removal of a cover while the system is in an enclosure locked state. As that memory is checked by POST, setting that segment to a distinctive state will result in a configuration error signal being generated which will alert a system owner that an attempt (successful or otherwise) has been made to breach system security. This setting of a memory segment to a distinctive state requires the previously stored password for purposes of booting an operating system; that is, booting an operating system requires entry of a valid PAP as otherwise disclosed in this description.

The keylock switch 64 and main enclosure cover switch 65 are preferably mounted on a front card guide member 69 (FIGS. 2 and 6) so as to be appropriately positioned relative to the lock provided in the main enclosure cover 15. The front card guide member is mounted in the computer system frame in such a position that an actuating lever 70 for the cover switch 65 protrudes through an opening in an upright front frame member, to be actuated by the cover 15 when present and positioned to close the system enclosure.

The cable cover switch 66 is preferably mounted on the rear panel of the system frame, positioned to be actuated by a latch member mounted on the cable cover 16 and rotatable under the control of a manually operable keylock similar to that provided on the enclosure cover 15. When the optional cable cover 16 is used (as will be the case where full security of the system is desired or required), latching or locking of the cover to the rear panel causes the latch member to close the associated normally open contact set 66a and open the normally closed contact set 66b.

The security and integrity features described above and hereinafter work independently of a previously offered personal computer security feature, the Power on Password (POP). These additional security and integrity features provide a secure platform for operating system certification under applicable regulations such as the Orange Book. An additional password is required to place the system in secure mode. The new password is here referred to as the Privileged Access Password (PAP). To maintain compatibility with previous personal computer systems, the POP is still supported.

Password Security is implemented by system hardware features; an EEPROM, a security switch and a tamper evident cover switch, firmware, POST and the system software password utility. Once the PAP has been installed, the system is in secure mode. The PAP is saved in the EEPROM. A backup copy of the PAP is also maintained in the EEPROM. This is done to prevent accidental loss of the PAP when a power failure occurs during the installation, change, or removal of the PAP. The POP and at least certain bits indicative of the validity of the PAP (if installed) are stored in the NVRAM. Changes in data retained in the NVRAM and in the EEPROM are independent one from the other.

Two bits in the EEPROM are used as a state machine that lets POST know exactly where a power outage occurred in the update sequence and, if possible, recover from a system board replacement situation. The password utility maintains the update indicator field, a two bit state machine used during any access to the PAP. If a power outage occurred during the password modification, when power is restored POST checks the state machine (POST actually checks the state machine on all power ups.) If the PAP is updated successfully (a '00' state), POST proceeds in the normal manner. If the update has started before power is lost (a '01' state), POST will check for the presence of a valid backup PAP. If valid, POST copies the backup PAP into the storage for the primary PAP. If the option or security switch is not in the unlocked or write enable position an error will be displayed. The system owner will have to intervene by unlocking the covers and changing the position of the security switch. If the primary PAP has been updated successfully (a '10' state), POST will use the primary PAP (the new PAP) to validate any attempts to use the system reference diskette or boot the system partition. POST will assume the backup PAP is invalid. POST will copy the primary PAP to the backup PAP in this case.

If the backup PAP has been updated successfully (a '11' state), both the primary and backup PAP are considered valid and POST will verify the validity of the Primary PAP, prior to confirming the entry of the PAP by the user.

As mentioned above, the POP is maintained in CMOS memory. Two bits will be maintained in CMOS memory for use as password indicators for the PAP. One indicator is used to signify that the system is in secure mode (PAP installed). The second indicator is to signify that the PAP was correctly entered during the initial power on, cold boot. These two indicators will be initialized and set at a cold boot only. Prior to IPL, the indicators will be write protected unless the system reference diskette or system partition is booted, which requires the successful entry of any installed PAP. Changes in the POP and in the indicators are independent of any changes in the PAP stored in the EEPROM. However, changes in the CMOS memory can indicate security violations which require entry of a valid PAP for recovery permitting the loading of an operating system.

To prevent any unauthorized access to the passwords, the IPL device boot list, the EEPROM CRC, and all the indicators will be locked prior to Initial Program Load (IPL) booting an operating system. To lock out these areas, POST will set special hardware latches that cannot be reset unless the system is powered off. At the beginning of POST Stage I (initial power on), POST will check to see if the EEPROM is locked. If it is locked, POST will display an error and halt the system because the hardware is not functional. The system owner will need to intervene to remedy the situation, which might require that the system board be replaced. In one form of this invention, when the system has been tampered with, the first 14 bytes of CMOS RAM storage remain unaffected. The next 50 bytes of CMOS RAM are set to all "one's" (binary value 1) as briefly described above. Upon detecting this condition, POST displays an appropriate error. In another form of this invention, as little as a single bit may be set to a state indicative of tampering. In either instance, the system owner/authorized user will need to intervene to remedy the situation which might require entry of the PAP at the password prompt to boot from the system reference diskette or the system partition or that the system board be re-configured.

If the system owner forgets the PAP, the system board(s) affected will need to be replaced.

If the POP is forgotten, the system owner can destroy the contents of CMOS RAM as described above, and then enter the PAP (if installed) to boot a System Reference Diskette image to run the password utility, to reinstall the POP.

When a system has been powered on with neither password installed, POST will not prompt for a password. However, POST will lock the PAP, the backup PAP, the IPL device boot list, the EEPROM CRC, and all the indicators. This is done to prevent any accidental or malicious access to these areas.

When a system has been powered on with a POP installed but no PAP installed, POST will verify the POP checksum. If the checksum is good, POST will prompt the user to enter the POP. If the checksum is bad, POST will erase the POP in CMOS and not prompt for a password. Prior to booting any program over the network, the PAP, the backup PAP, the IPL device boot list, the EEPROM CRC, and all the indicators will be locked to prevent any access.

When a system has been powered on with a PAP installed, but no POP installed, POST will check the state machine and then verify the PAP password checksum. If the PAP checksum is good, POST proceeds normally. If the PAP checksum is bad, an error is displayed and the system is halted. This is to prevent a condition where POST could accidentally give unprotected access to a user to a system which was previously in secure mode when the EEPROM failed. The system owner will need to intervene to remedy the situation which might require that the system board be replaced.

When the system has been powered on with both a valid PAP and a valid POP installed, POST will prompt the user to enter a password. If the POP is entered, POST will not boot from a System Reference Diskette image. The system can only boot using the existing IPL device list. If the PAP is entered at the prompt rather than the POP, the user can boot from a System Reference Diskette image (if accessible over the network), or the normal IPL device list. An indicator is set that signifies that the PAP was successfully entered at initial power up time, so that a system reference diskette image boot may occur later on in this power on session. POST will not prompt the user for a password after a soft reboot, hence the need for the PAP successfully entered indicator and its protection. After POST verifies that either password is entered correctly, it will acknowledge the entry by displaying a confirmation icon.

In conjunction with the POST changes, the password utility must include support for the PAP. The utility will support installing, changing and removing a PAP, and will interlock these three functions with the position of the option or security switch. The security switch should remain in the locked position until an authorized user wishes to set the PAP. At that time, the user should remove the system covers and move the security switch to the unlocked (change) position; then the PAP can be set. When the security switch is placed in the unlocked position, hardware logic external to the EEPROM allows the storing of the PAP into the EEPROM. When the security switch is placed in the locked position, external hardware logic prevents any changes to the PAP location in the EEPROM. Appropriate messages will appear if the authorized user attempts to modify the PAP when the security switch is in the locked position. An additional safety feature is built into the password utility that prohibits the authorized user from setting the PAP equal to the POP. Checks will be made when setting or changing the PAP to ensure that the new PAP does not equal the current POP of the system. Also, when changing or removing the PAP, the current PAP must be known.

It is contemplated that a personal computer system will initially be shipped with the security switch in the locked position and the tamper evident cover locked. This is done to prevent any person other than the system owner from setting the system into secure mode. Unlike the POP, the PAP cannot be erased through hardware manipulation. If the PAP is forgotten or an unauthorized user places the system into secure mode, the system board must be replaced.

The memory elements, switches and their interconnections described above are referred to in this description as "security feature elements", reflecting that the components named are elements of the computer system which specifically enable the security features described.

In normal operation of a LAN station having security features and as described to this point, the LAN station on being powered up will enter into a Power On Self Test or POST sequence. Just prior to completing POST, the system will detect the presence of a remote Initial Program Load (or RIPL) capability which normally permits an operating system to be supplied from a LAN attached server which provides a logical boot drive for the medialess workstation. POST performs booting of the LAN station from such a device. Because the software being loaded by the RIPL function is unknown, POST will lock all protected fields in the security feature devices as described to this point.

As will be clear, in order to cause the LAN station to become a secured workstation on the network, there must be a way for a PAP to be set and that sequence must be protected for the system owner or an authorized user. Accomplishing that result is the focus of the present subject invention, now to be described in greater detail. The foregoing discussion will enable a clear understanding of the description which follows.

In order to install, change or remove the PAP or the IPL device boot list field in accordance with one method contemplated by this invention, there must be coordination between the server and the LAN station. Further, it is necessary to provide, in the NVRAM 68 of the LAN station, a special field for a Remote PAP Installation flag. During booting an image of the system reference diskette or configuration setting utilities from the RIPL source, the program being booted will detect the state of the security feature related fields addressed by POST. Finding them locked as a result of normal operation as described hereinabove, the system reference diskette program will set the Remote PAP Installation flag, issue a message that the user should power the LAN station off and then immediately on again, and then terminate by performing functions which block any further data processing by the LAN station.

At this point, the authorized user at the LAN station powers the station off and immediately on again. POST, going through its normal path, will detect the change in state of the Remote PAP Installation flag and continue normal operation toward booting from the server while leaving the security feature devices "unlocked" and available for change and the clearing the flag set for the Remote PAP Installation. Since the RIPL location identified in the server still contains a reference diskette image or configuration setting program, that program will be booted, enabling the authorized user then before the system to change the appropriate fields in the security feature devices to install a PAP, change or remove a PAP, and change the IPL device boot list if desired.

On completing such modifications, the authorized user should again power down the system, assuring that the memory has been cleared so that POST will return to locking the security device fields prior to RIPL.

In accordance with a second method of installing a PAP in a LAN station, coordination is also required between the server providing the medialess workstation a logical boot drive and the workstation. However, this method requires less time and therefore leaves the protected fields in the EEPROM and CMOS exposed for a shorter time period than the first method described above. This alternate method requires the medialess station to start in a powered down state.

When physically located in the immediate vicinity of the medialess workstation, the authorized user will instruct the user at the server to change the logical boot drive from the operating system image to a System Reference Diskette image, as in the method first described above. The authorized user at the medialess workstation will then power up the workstation. The authorized user at this time waits for a visual indication by POST to enter a three key keystroke sequence, Ctrl-Alt-Ins, on the keyboard. This key sequence is used to indicate to POST that the protected fields of the EEPROM and CMOS are not to be protected prior to booting the image on the server.

In this situation, it is the responsibility of the authorized user to ensure that the system reference diskette image is booted and that a PAP is installed or the system is powered off before leaving the immediate vicinity of the medialess workstation.

POST will initialize the video subsystem and then perform testing and initialization of other subsystems in the system. This includes memory, keyboard, timers, and DMA controller. Once the keyboard subsystem is initialized, the authorized user can enter the three key keystroke sequence, Ctrl-Alt-Ins. Once initialized, keyboard BIOS is capable of recognizing the Ctrl-Alt-Ins key sequence in a manner that is similarly used for recognizing the Ctrl-Alt-Del key sequence which is well known in the industry. No visual indication has been given to the authorized user at this time.

POST checks keyboard CBIOS to see if the sequence of keystrokes has been detected in the period between keyboard subsystem initialization and issuance of a visual cue indicating that a window has been opened by POST for the entry of the three key sequence. If the key sequence was detected in that period, POST does not open the System Partition Boot Key Sequence Detection Window. If the key sequence was not detected in that period, POST opens the System Partition Boot Key Sequence Detection Window. POST then moves the video cursor on the active display from its current position of Row 0, Column 0 (upper left corner) to Row 0, Column 79 (upper right corner). This is done to indicate the opening of the System Partition Boot Key Sequence Detection Window to the authorized user.

Next, POST initializes the diskette subsystem, performs an adapter ROM scan in order to integrate adapters with on-board ROM code into the system, and initializes the SCSI subsystem. It is during this window that the authorized user must enter the three key keystroke sequence, Ctrl-Alt-Ins, in order to inform POST to leave the protected fields exposed during the boot procedure.

At this point in POST, POST closes the System Partition Boot Key Sequence Detection Window and moves the video cursor on the active display from Row 0, Column 79 (upper right corner) back to its original position, Row 0, Column 0 (upper left corner). This signifies to the user that the System Partition Boot Key Sequence Detection Window is closed. If the authorized user had entered the three key keystroke sequence, either after keyboard initialization prior to the window opening or during the open window, POST sets a flag to indicate the detection of the keystroke sequence for later use. If the authorized user missed entering the keystroke sequence, the authorized user can follow the first described method to install the PAP or restart this method. Prior to the remote IPL, POST will check the keystroke sequence flag and see that the authorized user wishes to leave the protected EEPROM and CMOS fields unprotected.

POST will then follow the normal boot procedure until it discovers it needs to perform a remote IPL and follows that procedure with the protected fields unsecured. As in the first described method, once the boot image is loaded, the authorized user selects the Set Features option from the Main Menu. On the Set Features Menu, the authorized user selects the Set Passwords and Unattended Start Mode option in order to invoke the Password Utility. The authorized user then chooses the Set Privileged Access Password option and follows the instructions presented. The user should also define and install the IPL device boot sequence list at the same time. This ensures that the boot device chosen by the authorized user is always selected during the boot procedure.

Prior to leaving the medialess workstation, the authorized user should power off the workstation. Otherwise, if the workstation is left powered on, the security related fields of the EEPROM and CMOS would be exposed to unauthorized access. As in the first described method, this method is also used to change or remove the PAP and update the IPL device boot sequence list.

A window opened by POST to enter the Ctrl-alt-ins, is also described in co-pending application Ser. No. 716,594 filed Jun. 17, 1991 and entitled "Apparatus and Method for Loading a System Reference Diskette Image from a System Partition in a Personal Computer System." There it is used to invoke a System Reference Diskette image. In this disclosure it is used to indicate to POST to leave the protected fields open for the remote IPL.

It is important to this invention that the process of installing or changing a PAP avoids any transfer through the network of the critical data defining the PAP, thereby avoiding any possibility of that data becoming available or being misappropriated through the network.

In the drawings and specifications there has been set forth a preferred embodiment of the invention and, although specific terms are used, the description thus given uses terminology in a generic and descriptive sense only and not for purposes of limitation.

What is claimed is:

1. A LAN station personal computer system for exchanging data with a network and capable of securing data accessible to the system against unauthorized access, the system comprising:

a user input device for user entry of commands, a normally closed enclosure, an enclosure lock for normally maintaining said enclosure in a securely locked condition denying access to the interior of the enclosure apart from possession of a key for said enclosure lock, an erasable memory element mounted within said enclosure for selective activation to active and inactive states and for receiving and storing password data, an option switch mounted and accessible solely from within said enclosure and operatively connected with said erasable memory element for setting said erasable memory element to the active and inactive states, a system processor mounted within said enclosure and operatively connected with said user input device for executing programs and processing data during operation of the system and exchanging data with a network with which the system is associated as directed by user input through said user input device, said system processor being operatively connected with said erasable memory element for distinguishing between the active and inactive states of said memory element and for enabling modification of password data stored in said erasable memory element by user input through said user input device when said erasable memory element is in the active state, a read only memory (ROM) device mounted within said enclosure and operatively connected with said system processor for storing said programs for operation of the personal computer system, a prioritized initial loading program stored in said ROM device and being executed by said system processor for enabling initial loading of an operating system from a selected one of a plurality of sources accessible through the network with which the personal computer system is associated, and a security utility program stored remotely from the system for limited access through the network with which the personal computer system is associated and stored inaccessibly to either of a normal user and an unauthorized user of the personal computer system, said security utility program being executed by said system processor for enabling one of a system owner and an authorized user to (a) selectively modify said prioritized initial loading program by specifying a number and priority for selecting among said plurality of sources and (b) selectively modify password data stored in said erasable memory element by user input through said user input device, whereby one of a system owner and an authorized user can select which one of a plurality of operating systems otherwise possibly available for initial loading into the system is to be loaded and thereby secure data otherwise possibly accessible to a user of the system from being accessed by one of a normal user and an unauthorized user of the system.

2. A personal computer system in accordance with claim 1 wherein said option switch functions for enabling an operator to select between secured operation of the system and unsecured operation of the system by selecting respective active and inactive states of said memory element.

3. A personal computer system in accordance with claim 2 wherein said option switch is manually operable and positioned within said enclosure for manual access only after opening of said enclosure.

4. A personal computer system in accordance with claim 1 wherein said erasable memory element is an electrically erasable programmable read only memory device.

* * * * *